(12) United States Patent
Höhne et al.

(10) Patent No.: US 11,765,706 B2
(45) Date of Patent: Sep. 19, 2023

(54) COOPERATIVE INTER-NETWORK CHANNEL SELECTION

(71) Applicant: Nokia Technologies Oy, Espoo (FI)

(72) Inventors: Hans Thomas Höhne, Helsinki (FI); Mika Kasslin, Espoo (FI); Janne Petteri Tervonen, Espoo (FI); Jari Pekka Mustajärvi, Espoo (FI); Olli Alanen, Vantaa (FI); Esa Mikael Malkamäki, Espoo (FI)

(73) Assignee: Nokia Technologies Oy, Espoo (FI)

( * ) Notice: Subject to any disclaimer, the term of this patent is extended or adjusted under 35 U.S.C. 154(b) by 300 days.

(21) Appl. No.: 17/421,752

(22) PCT Filed: Jan. 23, 2019

(86) PCT No.: PCT/EP2019/051610
§ 371 (c)(1),
(2) Date: Jul. 9, 2021

(87) PCT Pub. No.: WO2020/151816
PCT Pub. Date: Jul. 30, 2020

(65) Prior Publication Data
US 2022/0095305 A1  Mar. 24, 2022

(51) Int. Cl.
*H04W 72/0453* (2023.01)
*H04W 72/02* (2009.01)
*H04W 74/00* (2009.01)
*H04W 72/542* (2023.01)

(52) U.S. Cl.
CPC ....... *H04W 72/0453* (2013.01); *H04W 72/02* (2013.01); *H04W 72/542* (2023.01); *H04W 74/008* (2013.01)

(58) Field of Classification Search
CPC .................................................. H04W 72/0453
See application file for complete search history.

(56) References Cited

U.S. PATENT DOCUMENTS

| 2015/0282053 | A1 | 10/2015 | Kneckt et al. |
| 2018/0092081 | A1* | 3/2018 | Chen ...................... H04W 16/14 |
| 2019/0215788 | A1* | 7/2019 | Zhang ................ H04W 56/0015 |

OTHER PUBLICATIONS

International Search Report and Written Opinion received for corresponding Patent Cooperation Treaty Application No. PCT/EP2019/051610, dated Sep. 11, 2019, 11 pages.
"Forward Compatibility Considerations on NR Operations of the Unlicensed Band", 3GPP TSG RAN WG1 Meeting #87, R1-1611248, Agenda : 7.1.7, Huawei, Nov. 14-18, 2016, 4 pages.

* cited by examiner

*Primary Examiner* — Hsinchun Liao
(74) *Attorney, Agent, or Firm* — Nokia Technologies Oy

(57) ABSTRACT

This document discloses a solution for selecting a frequency channel for a service. According to an aspect, a method comprises: receiving, by a first access node of a first wireless network, a scanning message comprising at least one information element indicating a channel access limit for a frequency channel operated by a second access node of a second wireless network; selecting, by the first access node on the basis of the at least one information element, the frequency channel or another frequency channel for an ultra-reliable low-latency (URLLC) service provided by the apparatus; and upon selecting the frequency channel for the URLLC service, causing by the first access node transmission of frames of the service within channel access limits indicated by the at least one information element.

20 Claims, 4 Drawing Sheets

COOPERATIVE INTER-NETWORK CHANNEL SELECTION

RELATED APPLICATION

This application claims priority to PCT Application No. PCT/EP2019/051610, filed on Jan. 23, 2019, each of which is incorporated herein by reference in its entirety.

FIELD

Various embodiments described herein relate to the field of wireless communications and, particularly, to wireless networks cooperating in channel selection.

BACKGROUND

Wireless networks operating on licensed frequency bands expand their operation to an unlicensed spectrum. Other wireless networks operate mainly or only on the unlicensed frequencies. Regulations have been designed for the unlicensed spectrum usage to ensure fair spectrum use across various spectrum users. Occupation of the unlicensed spectrum is inherently uncoordinated across the networks and provide a larger degree of unpredictability to the operation and performance, making the provision of certain services challenging. For example, many wireless networks provide services that require high reliability and low latency (ultra-reliable low latency communication, URLLC). Provision of such a service requires a certain degree of certainty that the requirements of the service can be met in the presence of other wireless networks operating on the same frequency band.

BRIEF DESCRIPTION

Some aspects of the invention are defined by the independent claims.

Some embodiments of the invention are defined in the dependent claims.

According to an aspect, there is provided an apparatus comprising means for performing: receiving a scanning message comprising at least one information element indicating a channel access limit for a frequency channel operated by an access node of a second wireless network; selecting, on the basis of the at least one information element, the frequency channel or another frequency channel for an ultra-reliable low-latency, URLLC, service provided by the apparatus; and upon selecting the frequency channel for the URLLC service; causing transmission of frames of the service within channel access limits indicated by the at least one information element.

In an embodiment, the URLLC service has minimum requirements for channel access in terms of latency and reliability, and the means are further configured to determine whether or not the channel access limits indicated by the at least one information element allow the minimum requirements for the channel access and to select the frequency channel, if the channel access limits indicated by the at least one information element allow the minimum requirements for the channel access.

In an embodiment, the means are configured to, upon selecting the frequency channel, select channel access parameters for the frames such that the channel access parameters are more limited than what is indicated by the channel access limit.

In an embodiment, the channel access limit defines a maximum channel occupancy time, and the means are configured to select a maximum channel occupancy time that is shorter than the maximum channel occupancy time indicated by the channel access limit.

In an embodiment, the channel access limit indicates that the access node of the second wireless network operates an URLLC service on the frequency channel, and wherein the means are configured to select the frequency channel for the URLLC service provided by the apparatus.

In an embodiment, the means are configured to select channel access limits for the service on the selected frequency channel and to cause transmission of a scanning message indicating the selected channel access limits.

In an embodiment, the means are configured to measure channel occupancy rate on the selected frequency channel and to select channel access parameters for the frames on the basis of said measured channel occupancy rate.

In an embodiment, the means are configured to select a maximum channel occupancy time on the basis of the measured channel occupancy rate.

In an embodiment, the means are further configured to determine whether or not another wireless network operates on the selected frequency channel, to select a first value of a channel access parameter for the frames if another wireless network is determined to operate on the selected frequency channel, and to select a second value of the channel access parameter for the frames if no other wireless network is determined to operate on the selected frequency channel, and wherein the first value defines more limited channel access than the second value.

In an embodiment, the first wireless network operates according to a different radio access technology than the second wireless network.

In an embodiment, the means comprises: at least one processor; and at least one memory including computer program code, the at least one memory and computer program code configured to, with the at least one processor, cause the performance of the apparatus.

According to an aspect, there is provided a method comprising: receiving, by a first access node of a first wireless network, a scanning message comprising at least one information element indicating a channel access limit for a frequency channel operated by a second access node of a second wireless network; selecting, by the first access node on the basis of the at least one information element, the frequency channel or another frequency channel for an ultra-reliable low-latency, URLLC, service provided by the apparatus; and upon selecting the frequency channel for the URLLC service, causing by the first access node transmission of frames of the service within channel access limits indicated by the at least one information element.

In an embodiment, the URLLC service has minimum requirements for channel access in terms of latency and reliability, and the first access node determines whether or not the channel access limits indicated by the at least one information element allow the minimum requirements for the channel access and selects the frequency channel, if the channel access limits indicated by the at least one information element allow the minimum requirements for the channel access.

In an embodiment, the first access node selects, upon selecting the frequency channel, channel access parameters for the frames such that the channel access parameters are more limited than what is indicated by the channel access limit.

In an embodiment, the channel access limit defines a maximum channel occupancy time, and wherein the first access node selects a maximum channel occupancy time that is shorter than the maximum channel occupancy time indicated by the channel access limit.

In an embodiment, the channel access limit indicates that the second access node of the second wireless network operates an URLLC service on the frequency channel, and wherein the first access node selects the frequency channel for the URLLC service provided by the first access node.

In an embodiment, the first access node selects channel access limits for the service on the selected frequency channel and causes transmission of a scanning message indicating the selected channel access limits.

In an embodiment, the first access node measures channel occupancy rate on the selected frequency channel and selects channel access parameters for the frames on the basis of said measured channel occupancy rate.

In an embodiment, the first access node selects a maximum channel occupancy time on the basis of the measured channel occupancy rate.

In an embodiment, the first access node determines whether or not another wireless network operates on the selected frequency channel, selects a first value of a channel access parameter for the frames if another wireless network is determined to operate on the selected frequency channel, and selects a second value of the channel access parameter for the frames if no other wireless network is determined to operate on the selected frequency channel, and wherein the first value defines more limited channel access than the second value.

In an embodiment, the first wireless network operates according to a different radio access technology than the second wireless network.

According to another aspect, there is provided a computer program product embodied on a computer-readable medium and comprising a computer program code readable by a computer, wherein the computer program code configures the computer to carry out a computer process comprising: receiving, by a first access node of a first wireless network, a scanning message comprising at least one information element indicating a channel access limit for a frequency channel operated by a second access node of a second wireless network; selecting, by the first access node on the basis of the at least one information element, the frequency channel or another frequency channel for an ultra-reliable low-latency, URLLC, service provided by the apparatus; and upon selecting the frequency channel for the URLLC service, causing by the first access node transmission of frames of the service within channel access limits indicated by the at least one information element.

LIST OF DRAWINGS

Embodiments are described below, by way of example only, with reference to the accompanying drawings, in which FIG. 1 illustrates a wireless communication scenario to which some embodiments of the invention may be applied;

DESCRIPTION OF EMBODIMENTS

The following embodiments are examples. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

Figure 1:
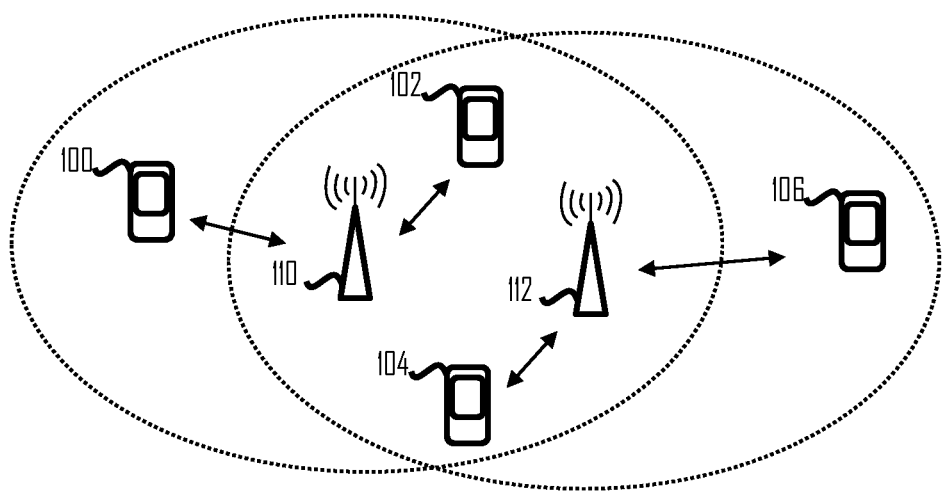

A general wireless communication scenario to which embodiments of the invention may be applied is illustrated in FIG. 1. FIG. 1 illustrates wireless communication devices comprising a plurality of access points (AP) 110, 112 and a plurality of wireless terminal devices or stations (STA) 100 to 106. Each AP may manage wireless access in a limited coverage area. The AP may provide a wireless network such as a basic service set (BSS) which is a basic building block of an IEEE 802.11 wireless local area network (WLAN). The most common BSS type is an infrastructure BSS that includes a single AP together with all STAs associated with the AP. The AP may be a fixed AP or it may be a mobile AP, and a general term for an apparatus managing a wireless network such as the BSS and providing the stations with wireless services is an access node. In another scenario, the AP may manage a cell of a radio access network of a cellular communication system such as UMTS LTE (Long-term Evolution for Universal Mobile Telecommunication System) or a 5G next generation radio. The APs 110, 112 may also provide access to other networks, e.g. the Internet. The APs 110, 112 may be capable of communicating with one another. If the APs 110, 112 support the same radio access technology, a dedicated interface may be provided between them, e.g. X2 interface of the LTE. In another embodiment, the APs 110, 112 may communicate over a radio interface by using beacon frames and/or other scanning frames. The other scanning frames may include probe requests and probe responses, for example. In some embodiments, the STAs 100 to 106 may mediate information between the APs 110, 112, e.g. when the APs 110, 112 are not capable of communicating directly. For example, the STA 102 connected to the AP 110 and located in the coverage area of both APs 110, 112 may be capable of detecting broadcast messages transmitted by the AP 112 and report at least some contents of the broadcast messages to the AP 110.

The APs 110, 112 may be configured to operate on unlicensed frequency bands and to establish frequency channels for frame transmissions on the unlicensed bands. Transmissions on the unlicensed bands may be based on first sensing the channel and, upon detecting the channel to be idle, carrying out frame transmission. This scheme is called Listen Before Talk (LBT). Some IEEE 802.11 networks employ channel contention based on carrier sense multiple access with collision avoidance (CSMA/CA) for channel access. Every device attempting to gain a TXOP is reducing a backoff value while the primary channel is sensed to be idle for a certain time interval. The backoff value may be selected randomly within a range defined by a contention window parameter. The contention window may have different ranges for different types of traffic, thus affecting priority of the different types of traffic. The channel sensing may be based on sensing a level of radio energy in the radio channel. The sensed level may be compared with a threshold: if the sensed level is below the threshold level, the channel may be determined to be idle (otherwise busy). Such a procedure is called clear channel assessment (CCA) in 802.11 specifications. When the backoff value reaches zero, the STA gains the TXOP and starts frame transmission. If another STA gains the TXOP before that, the backoff value computation may be suspended, and the STA continues the backoff computation after the TXOP of the other STA has ended and the primary channel is sensed to be idle. The time duration (the backoff value) may not be decremented during the TXOP of the other STA, but the time duration that already lapsed before the suspension may be maintained, which means that the device now has a higher probability of gaining the TXOP. Other wireless networks such as the LTE may employ a similar but to some degree different CSMA or CCA procedure. Upon acquiring the TXOP by a STA, the STA may carry out frame transmissions for a determined time interval defined by a channel occupancy time (COT). The COT may have a fixed value or a dynamic value adapted on the basis of some criteria. Some embodiments for the adaptation are described below.

Once a device or node has obtained a TXOP that shall not exceed a maximum COT (MCOT), another device communicating with first device may also use that TXOP. This type of TXOP may be called a shared TXOP. The purpose of a shared TXOP is to allow a rapid exchange of bi-directional transmissions for instance to acknowledge transmissions or perform data transmissions in the reverse direction. Another purpose of a shared TXOP is that a node may schedule devices to the TXOP it has obtained.

The STA 100 to 106 may be considered to be a terminal device or a station capable of connecting or associating to any one of the APs 110, 112. The STA may establish a connection with any one of APs it has detected to provide a wireless connection within the neighbourhood of the STA. The connection establishment may include authentication in which an identity of the STA is established in the AP. The authentication may comprise setting up an encryption key used in the BSS. After the authentication, the AP and the STA may carry out association in which the STA is fully registered in the BSS, e.g. by providing the STA with an association identifier (AID). It should be noted that in other systems terms authentication and association are not necessarily used and, therefore, the association of the STA to an AP should be understood broadly as establishing a connection between the STA and the AP such that the STA is in a connected state with respect to the AP and waiting for downlink frame transmissions from the AP and monitoring its own buffers for uplink frame transmissions. A STA not associated to the AP is in an unassociated state. An unassociated STA may still exchange some frames with the AP, e.g. scanning frames or discovery frames.

A 3GPP work study focuses on scenarios and requirements for next generation access technologies and considers an ultra-reliable low-latency communications (URLLC) service as one scheme to be supported in the future wireless networks. Examples for typical use cases of URLLC include industrial control, tactile Internet, and the like, as described in 3GPP documents about new services and markets technology enablers. With respect to the low-latency in the URLLC service, the URLLC aims for user plane latency as low as 0.5 ms (milliseconds) for uplink and for downlink, although different requirements may be set. User plane latency may be defined as a time duration to successfully deliver an application layer packet/message from a radio protocol layer 2/3 service data unit (SDU) ingress point to a radio protocol layer 2/3 SDU egress point via a radio interface in both uplink/downlink. A context may be such that neither a transmitter nor a receiver is in a discontinuous transmission/reception state. With respect to the reliability related to the URLLC, the supported reliability may be up to be 10 $e^{-5}$ (packet error rate) within 1 ms for use cases such as eHealth surgical robots operating mainly in very deep indoor environment. One definition to the URLLC service is sub-millisecond latency with error rates that are lower than one packet loss in $10^5$ packets.

The APs 110, 112 may be configured to provide the URLLC service that defines minimum requirements for channel access in terms of latency and reliability. The APs 110, 112 may further provide other access services such as a mobile broadband (MBB) service that defines the minimum requirements for the channel access in terms of other characteristics such as data rates or data throughput. When multiple APs provide both service types on an unlicensed spectrum where the APs may end up operating on the same frequency channel, there is potential that one service type renders the provision of the other service type impossible for an AP. For example, it may be in the interest of the APs 110, 112 to arrange their shared resource usage such that their MBB services are not mutually jeopardizing their URLCC services.

Figure 2:
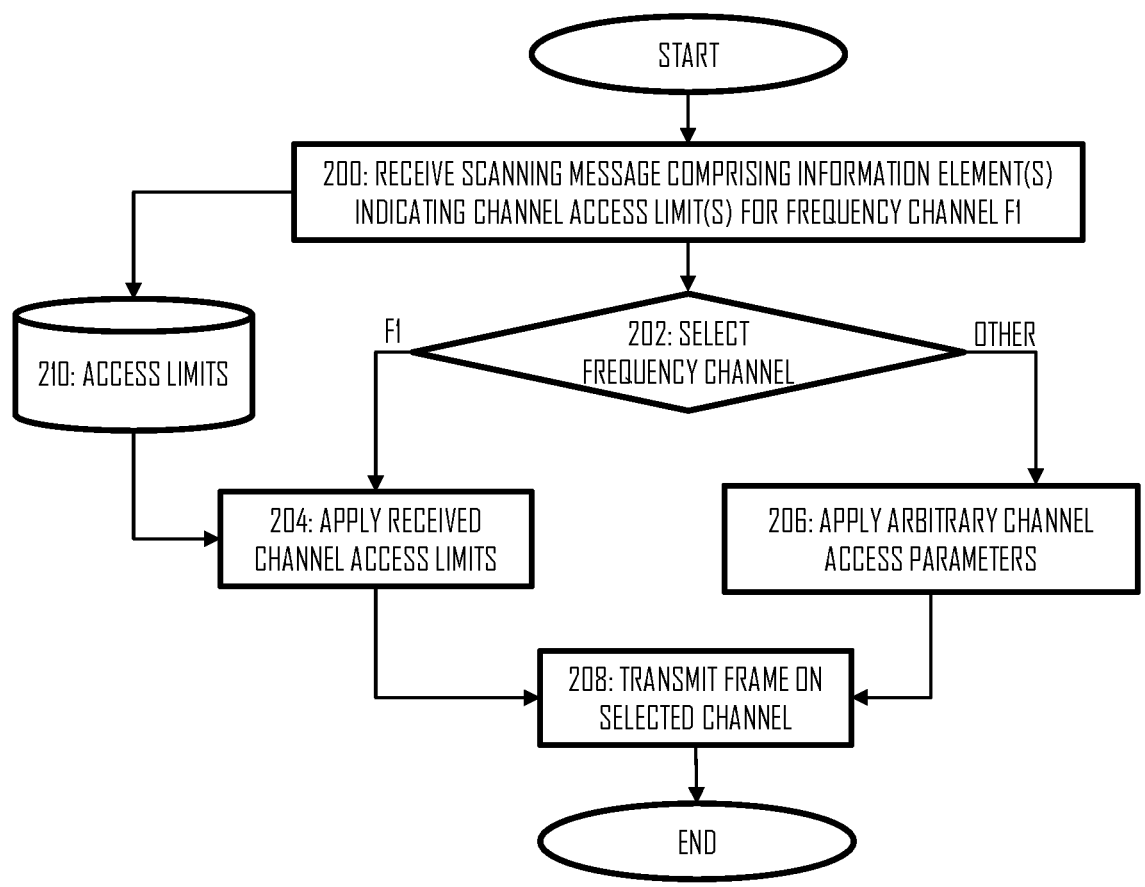
FIG. 2 illustrates an embodiment of a process for selecting a frequency channel for an ultra-reliable low latency service.

FIG. 2 illustrates a process for selecting a frequency channel for an URLLC service. The process may be executed by an access node of a first wireless network such as the AP 110 providing the URLLC service. The process comprises receiving (block 200) a scanning message comprising at least one information element indicating a channel access limit for a frequency channel operated by an access node of a second wireless network, e.g. the AP 112; selecting (block 202), on the basis of the at least one information element, the frequency channel or another frequency channel for the URLLC service; and upon selecting the frequency channel for the URLLC service, causing transmission of frames of the URLLC service within channel access limits indicated by the at least one information element (block 204 and 206).

Upon detecting the channel access limits for the frequency channel, the AP 110 may store the channel access limits in a memory 210 for use in case the AP 110 selects the frequency channel for the frame transmissions.

Upon selecting the other frequency channel, channel access limits or channel access parameters of the URLLC service may be selected by using other criterion/criteria (block 206).

As described above, the URLLC service defines minimum requirements for channel access in terms of latency and reliability. In an embodiment, the selection in block 202 determines whether or not the channel access limits indicated by the at least one information element allow the minimum requirements for the channel access. If the channel access limits indicated by the at least one information element allow the minimum requirements for the channel access, the frequency channel may be selected and the process proceed to block 204. Otherwise, another frequency channel allowing the minimum requirements to be satisfied is selected and the process may proceed to block 206.

In an embodiment, the channel access limits received in the scanning message indicates that the access node of the second wireless network operates an URLLC service on the frequency channel, and wherein the means are configured to select the frequency channel for the URLLC service provided by the apparatus. The channel access limits may allow the AP 110 to detect that the frequency channel is currently used for a URLLC and to select the frequency channel for the URLLC service provided by the AP 110. Sharing the frequency channel amongst services of the same type may improve the probability of acceptable performance of the services, because a traffic profile may be substantially similar. For example, if the AP 112 uses a frequency channel for a MBB service, the MBB service may reserve the frequency channel for such a long duration that the latency requirement of the URLLC service cannot be met. Therefore, the AP 110 may avoid such frequency channels where the channel access limits indicate a MBB service or indicates a non-URLLC service. In an embodiment, the channel access limit indicates explicitly the URLLC service provided by the access node 112 on the frequency channel, e.g. with a unique identifier of the URLLC service.

In an embodiment, the channel access limit comprises a maximum channel occupation time (COT). The maximum COT may be shorter for the URLLC service than for the MBB service or otherwise unique to the URLLC and, thus, allow the detection of whether there is the URLLC provided on the frequency channel. In an embodiment, the channel access limit comprises a minimum time the frequency channel shall be kept free after channel occupancy. In an embodiment, the channel access limit comprises contention parameters for channel contention on the frequency channel. In an embodiment, the channel access limit comprises a maximum transmission power. Analogously, these channel access limits may have unique values for the URLLC service (and the other service types), thus enabling detection of the URLLC service on the frequency channel.

In an embodiment, the scanning message is a beacon frame, e.g. a beacon of an IEEE 802.11 network. In an embodiment, the scanning message is a probe response frame of the 802.11 network.

In an embodiment, the scanning message is received from an access node and indicates the channel access limits employed by the access node. In an embodiment, the scanning message is received from an access node and indicates the channel access limits employed by another access node. For example, the 802.11 networks may deliver information on neighbour networks in overlapping BSS (OBSS) information.

In an embodiment, the scanning message is a downlink broadcast signal carrying a system information block according to 3GPP specifications.

In an embodiment, the AP 110 transmits a scanning request to the AP 112 to request for channel access limits used by the AP 112, and the scanning message is a scanning response message received from the AP 112.

In an embodiment, the scanning message is a neighbour report received from a station associated to the AP 110, e.g. the STA 102. A neighbour report may comprise one or more channel access limits based on measurement results obtained by the associated station. An obtained measurement result may be indicative of access statistics of an access node and/or a station of the second wireless network in the frequency channel. An access point, such as AP 110, may configure the associated station, e.g. STA 102, to provide an obtained measurement result in the neighbour report only if one or more evaluated access statistics fulfil a certain trigger condition for reporting. The trigger condition for reporting may be configured by an access point, such as AP 110.

In an embodiment, the apparatus executing the process of FIG. 2 is a station searching for a wireless network to which to establish an association. The station may be searching for a wireless network capable of providing an URLLC service, and the process of FIG. 2 may be used for such a purpose.

In an embodiment, the apparatus executing the process of FIG. 2 is an access node, e.g. the access node 110.

In an embodiment, upon selecting the frequency channel for the URLLC service the AP 110 transmits a scanning message advertising channel access limits of the URLLC service on the frequency channel. In this manner, the AP 110 may advertise that it is using the frequency channel for the URLLC service. Accordingly, another AP searching for a frequency channel for a MBB service may avoid the frequency channel, thus improving coexistence on the unlicensed shared frequencies.

In an embodiment, the process of FIG. 2 is triggered when the URLLC service is being established. In another embodiment, the process of FIG. 2 is triggered when the URLLC service is operational or has been operational, e.g. data frame transmissions have been carried out. For example, the AP 110 may monitor for a scanning message indicating a change in the channel access limits of another AP on the frequency channel. As another example, the AP 110 may monitor whether or not other networks operating on the frequency channel comply with the channel access limits. If the monitoring results in detection of changed channel access limits or violation of the channel access limits and subsequent need to search for another channel for the URLLC service, the AP 110 may trigger the process of FIG. 2.

In an embodiment, the process of FIG. 2 may be modified for another service type, e.g. the MBB service. In such a case, the process may comprise receiving (block 200) a scanning message comprising at least one information element indicating a channel access limit for a frequency channel operated by an access node of a second wireless network, e.g. the AP 112; selecting (block 202), on the basis of the at least one information element, the frequency channel or another frequency channel for the (MBB) service; and upon selecting the frequency channel for the (MBB) service, causing transmission of frames of the (MBB) service within channel access limits indicated by the at least one information element (block 204 and 206). For example, when the channel access limits indicate that there is an URLLC service provided on the frequency channel, the process may avoid selecting the frequency channel for the other service type, e.g. the MBB service, and continue searching for a suitable frequency channel for the (MBB) service.

In general, the process of FIG. 2 may be used to compare the channel access limits of the frequency channel with channel access parameters of the service the apparatus executing FIG. 2 is providing and, if there is a match between the channel access limits are suitable for the service, the apparatus may select the frequency channel.

Figure 3:
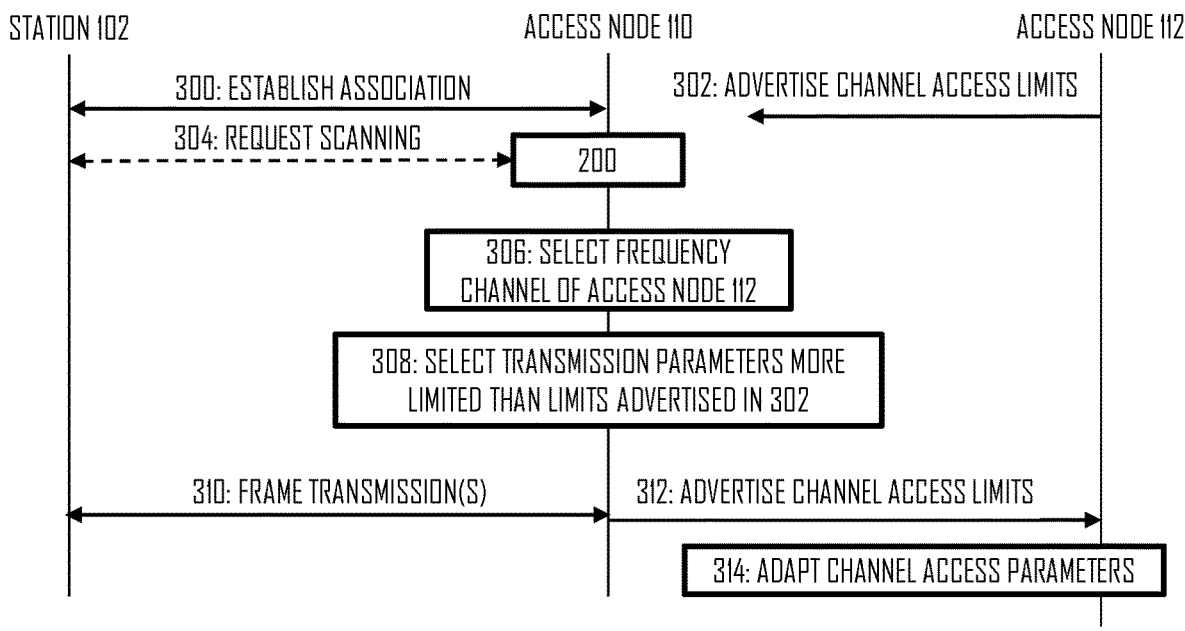
FIG. 3 illustrates a signalling diagram of a process for selecting a frequency channel and channel access parameters for an ultra-reliable low latency service according to some embodiments of the invention.

FIG. 3 illustrates a signalling diagram according to an embodiment where the access node 110 selects a frequency channel for the URLLC service. Referring to FIG. 3, the station 102 may associate to the access node in step 300, e.g. in the above-described manner. In step 302, the access node 112 operating on a frequency channel transmits a scanning message advertising channel access limits for the frequency channel. The scanning message may be transmitted on the frequency channel. The access node 110 acquires the channel access limits in block 200, either directly from the scanning message received in step 302 or through the station 102 that received the scanning message in step 302. The access node 110 may request (block 304) the station 102 to report any neighbouring wireless networks the station 102 has detected and their communication parameters, e.g. the channel access limits. The station 102 may obtain the channel access limits directly from a neighbouring access node or by performing measurements on the channel. For example, the station 102 may measure channel occupancy times of transmissions on the channel and determine the maximum COT on the basis of the measurements. In an embodiment, the access nodes 110 and 112 may support different radio access technologies. The access node 110 may support 802.11 specifications while the access node 112 supports a cellular communication protocol such as the LTE or 5G next generation radio. Accordingly, the access nodes 110 and 112 may be incapable of directly receiving frames from one another. The station 102 may support both radio access technologies and the request in step 304 may encompass the station 102 reporting any neighbouring networks operating on the frequency channel and supporting a radio access technology different from the radio access technology of the access node 110.

Block 200 may be executed in connection with channel scanning performed by the access node 110 when establishing or operating the URLLC service. In block 306, the access node 110 determines that the channel access limits are acceptable for the URLLC service and selects the frequency channel on which the access node 112 operates. In block 308, the access node selects channel access parameters for frames to be transmitted on the frequency channel such that the channel access parameters are more limited than what is indicated by the channel access limit. In other words, the access node 110 may select even more limited channel access parameters than that indicated by the received channel access limits. For example, the access node 110 may select a shorter COT than a maximum COT indicated in the received channel access limits, or the access node 110 may select a lower transmission power than a maximum transmission power indicated in the received channel access limits. Upon selecting the more limited channel access parameters, the access node may determine that the more limited channel access parameters shall be complied with by the other access node(s) operating on the frequency channel, e.g. the access node 112. As a consequence, the access node 110 may transmit, in step 312, a scanning message indicating at least one of the selected channel access parameters as a channel access limit (or limits) for the frequency channel.

The access node 112 receiving the scanning message in step 312 may execute block 314 and adapt its channel access parameters to comply with the channel access limit(s) received in step 312. In step 310, the access node 112 may exchange frames with the station 102 by using the selected channel access parameters of the URLLC service. The access node 112 may also execute the process of FIG. 2 to perform channel scanning and reselection because of the changed channel access limits.

In another embodiment, the access node 110 may advertise in step 312 the same channel access limits as advertised by the access node 112 in step 302 even if the access node selected more limited channel access parameters in block 308. In yet another embodiment, the access node 110 may select the channel access parameters that are the same as indicated in step 302 and advertise in step 312 the same channel access limits as advertised by the access node 112 in step 302. In other words, block 308 would be modified such that the access node selects the channel access parameters that are the same as indicated in step 302.

In the embodiments above, the frequency channel is selected on the basis of the channel access limits advertised by an(other) access node for the frequency channel. In another embodiment, the frequency channel and/or the channel access parameters for the frequency channel are selected on the basis of measurements performed on the channel. For example, block 308 may be based on both the channel access limits advertised in step 302 and the measurements performed on the frequency channel where the channel access limits are applied.

According to an embodiment, there is provided an apparatus comprising means for performing: measuring channel occupation on a frequency channel dedicated for URLLC services; selecting channel access parameters on the basis of the measurements; and causing transmission of a frame of an URLLC service on the frequency channel by using the channel access parameters.

In an embodiment, the apparatus is the access node 110, and the access node 110 transmits the frame. In another embodiment, the apparatus is the station 102 and the station 102 transmits the frame. In another embodiment, the access node 110 performs the measurement and the selection of the channel access parameters such as one or more of the above-described channel access limits and signals the channel access parameters to the station 102 and, thus, configures the station 102 to transmit the frame to the access node by using the channel access parameters.

In an embodiment, the (unlicensed) frequency channel is dedicated to the URLLC services when at least one wireless network operates a URLLC service on the frequency channel and an access node(s) managing the at least one wireless network advertises channel access limits associated with the URLLC services on the frequency channel (step 302). The access node(s) may further advertise support for URLLC spectrum sharing on a frequency channel which would cause other access nodes to not to allocate services other than the URLLC to the frequency channel. In an embodiment, an unlicensed spectrum regulator may have dedicated the frequency channel to the URLLC services, and the access nodes 110, 112 may be bound by such regulations.

Figure 4:
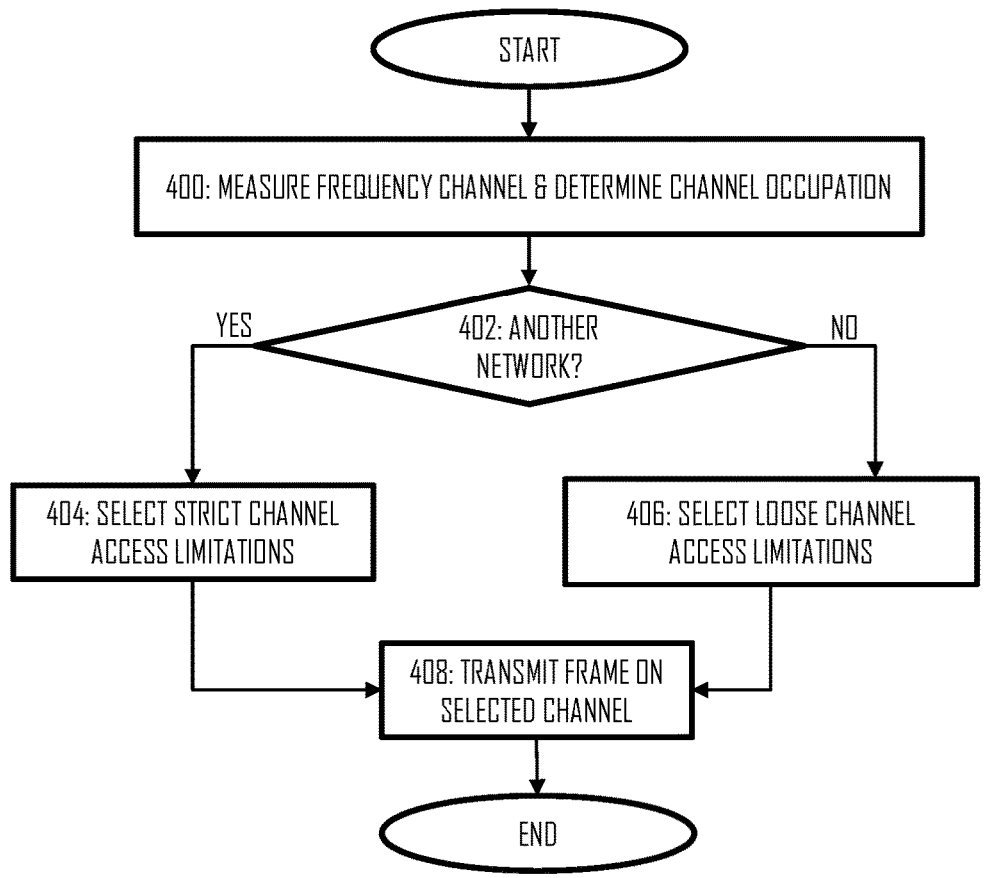
FIGS. 4 and 5 illustrate flow diagrams for selecting channel access parameters on the basis of channel measurements performed on a frequency channel according to an embodiment of the invention.
Figure 5:
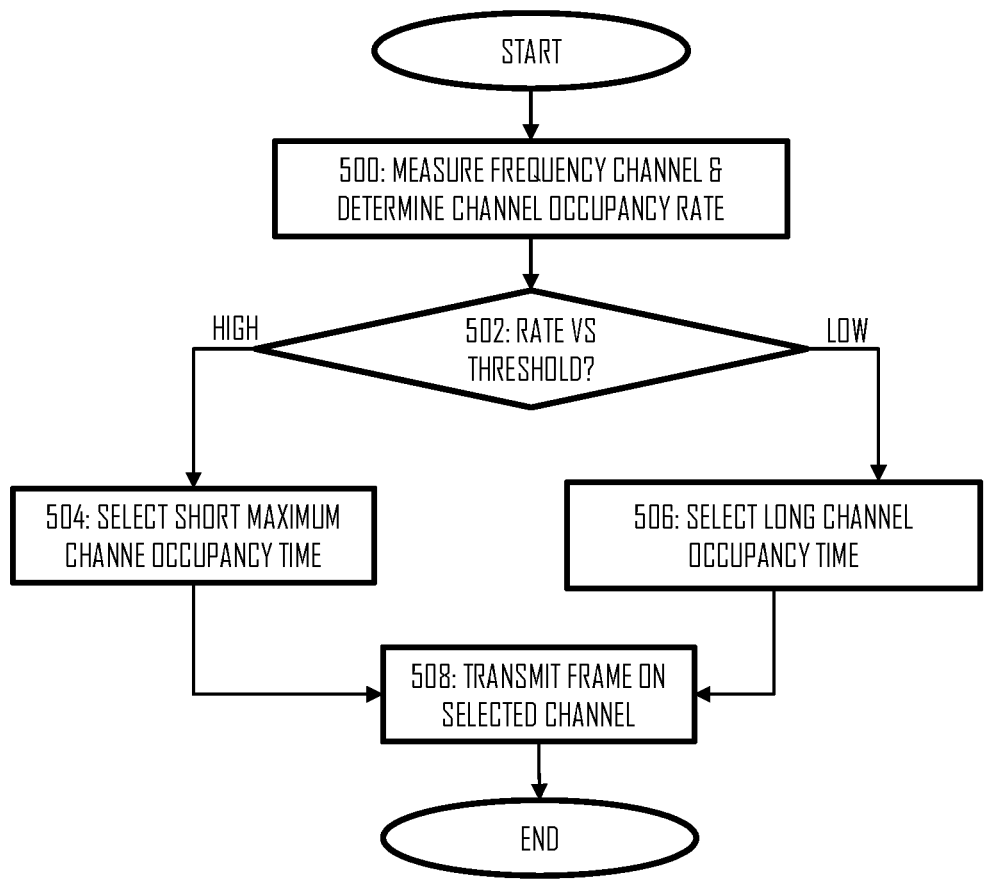

FIGS. 4 and 5 illustrate flow diagrams of some embodiments for selecting the channel access parameters on the basis of the measurements. In the embodiment of FIG. 4, the apparatus determines whether or not another wireless network operates on the frequency channel, selects a first value of a channel access parameter for the frame if another wireless network is determined to operate on the selected frequency channel, and selects a second value of the channel access parameter for the frame if no other wireless network is determined to operate on the selected frequency channel. The first value may define more limited channel access than the second value. In an embodiment, the process of FIG. 4 is carried out upon determining that there is another wireless network providing the URLLC service on the selected frequency channel. If it is determined that there is another wireless network providing, for example, generic 802.11 services, the value of the channel access parameter may be selected according to another criterion.

Referring to FIG. 4, the apparatus measures the frequency channel and determines the channel occupation in block 400. Block 400 may comprise scanning the channel in a CCA procedure. Upon detecting a signal on the channel, the apparatus may attempt to synchronize to the signal and, if successful, decode a header or at least some information comprised in a frame carried by the signal. The decoded header may be a medium access control (MAC) header. The apparatus may decode a network identifier or a transmitter address from the frame in block 400. In block 402, the apparatus determines a wireless network associated with the frame, e.g. on the basis of the network identifier or the transmitter address. Upon determining that the frame is associated to the network of the apparatus, the process may proceed to block 406 where the apparatus selects loose channel access parameters or channel access limitations, e.g. a long COT, and transmits in block 408 the frame by using the selected channel access parameters or channel access limitations. However, if the frame is determined in block 402 to be associated with a network other than the network of the apparatus, the process proceeds to block 404 where the apparatus selects strict channel access parameters or channel access limitations, e.g. a short COT, and transmits in block 408 the frame by using the selected channel access parameters or channel access limitations.

In an embodiment where the apparatus is the station 102, upon detecting the frame associated with the other network, the station reports the detected network to the serving access node 110. Upon detecting the channel access limits imposed on the frequency channel, the station 102 may report the channel access limits as well, e.g. as described above in connection with step 304 without a separate request from the access node 110.

In an embodiment, the process of FIG. 4 is carried out when establishing the association (step 300). Alternatively or additionally, the process of FIG. 4 may be carried out during the association, e.g. after transmitting frames during the association. For example, the apparatus may have selected some channel access parameters before executing block 400 and, then, change the channel access parameters upon detecting the other network in blocks 400 and 402. For example, the apparatus may employ a long COT while the network of the apparatus is detected as the only network operating on the frequency channel and, upon detecting the other network, the apparatus may switch to the short COT. Similarly, upon detecting that the other network(s) has/have ended operation on the frequency channel, the apparatus may carry out block 406 and return to the long COT or otherwise loose channel access limitations.

In the embodiment of FIG. 5, the apparatus measures a channel occupancy rate on the selected frequency channel and selects the channel access parameters for the frame on the basis of said measured channel occupancy rate. Referring to FIG. 5, the apparatus measures the frequency channel and determines the channel occupancy rate in block 500. Then, the channel occupancy rate may be compared with a threshold in block 502. If the channel occupancy rate is above the threshold, the process may proceed to block 504 where the apparatus selects stricter channel access parameters, e.g. a short (maximum) COT. If the channel occupancy rate is below the threshold, the process may proceed to block 506 where the apparatus selects looser channel access parameters, e.g. a long COT that could be even a maximum COT allowed on the frequency channel (e.g. in advertisement of step 302 or by default). In block 508, a frame is transmitted by using the channel access parameters selected in block 504 or 506.

The apparatus may be the station 102 or the access node 110, as described above in connection with FIG. 4. The station 102 may report the measurements to the serving access node 110.

In the embodiment of FIG. 5, the apparatus gathers statistics on channel occupancy time and channel gap time as the channel occupancy rate and estimates an effective channel access delay. The channel gap time may refer to a time interval when the channel is free between two consecutive channel occupancies, e.g. TXOPs. The apparatus may then adjust the channel access parameters as a function of the observed channel access delay. The measurement of the channel occupancy time and the channel gap time may be mapped directly to an estimate of the channel access delay. If the channel occupancy time is higher than the channel gap time, the channel access delay may be estimated higher than in a case where the channel occupancy time is lower than the channel gap time. The apparatus may store a mapping table mapping different combinations of the channel occupancy time and the channel gap time to different channel access delays. The apparatus may then select the channel access parameters such as the (maximum) COT on the basis of the channel access delay. For a longer delay the apparatus may select a shorter (maximum) COT.

In an embodiment, the combination of the channel occupancy time and the channel gap time is a ratio of the channel occupancy time and the channel gap time within a determined time window. It may be understood as a measure of a channel load as well. The time window may be longer than 25 microseconds, for example. The channel occupancy time may comprise a mean channel occupancy time within the time window, and the channel gap time may comprise a mean channel gap time within the time window. In another embodiment, the channel occupancy time is measured from a certain percentile of channel occupancy durations, e.g. 95 percentile. It means that the apparatus takes into account only those TXOPs having a COT that falls within the percentile of COTs, e.g. a single TXOP having a very long COT may be excluded from the estimation. A similar percentile may be applied to the channel gap time: an individual exceptionally long or short channel gap time may be omitted from the estimation. In another embodiment, it may mean the opposite: measurement reporting provides only the measure of the 95 percentile, and the network reacts to those measurements.

In an embodiment of FIG. 5, the apparatus determines, on the basis of the measured channel occupancy rate, a number of channel gaps exceeding a certain channel gap time threshold. If the number of channel gaps is below a threshold, the apparatus may execute block 504. Otherwise, the apparatus may execute block 506.

As described above with respect to FIG. 4, the process of FIG. 5 may be carried out during the association and between frame transmissions on the frequency channel, e.g. periodically. One measurement occasion may have a duration of one symbol length, e.g. for a 30 kHz subcarrier spacing about 36 microseconds. Other scenarios may employ other symbol durations, and the duration of the measurement occasion may vary accordingly.

In an embodiment of FIGS. 4 and 5 where the apparatus is the station 102 and the frame transmission is a scheduled uplink transmission, the apparatus may employ the shorter COT in the uplink transmission regardless of the scheduled duration of uplink grant. The station may omit some of the scheduled uplink resources, e.g. or only partially fill the frame of an uplink grant that is too long with respect to the selected COT. The station 102 may also inform the serving access node 110 about the new COT that is needed and wait for the access node 110 to provide a shorter uplink grant.

Figure 6:
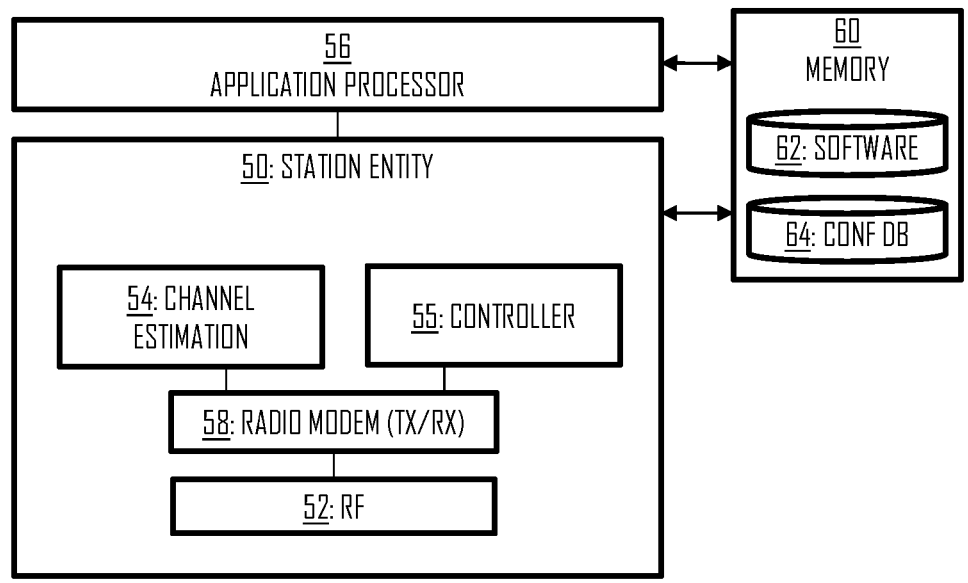
FIGS. 6 and 7 illustrate block diagrams of structures of apparatuses according to some embodiments of the invention.

FIG. 6 illustrates an embodiment of a structure of the above-mentioned functionalities of an apparatus executing the functions of the station in the embodiments described above for the station 102. The apparatus may be a terminal device or a client device of a wireless network, e.g. the 802.11 network or a cellular communication network. In other embodiments, the apparatus may be a circuitry or an electronic device realizing some embodiments of the invention in the station. The apparatus may comply with 802.11 specifications. The apparatus may be or may be comprised in a computer (PC), a laptop, a tablet computer, a cellular phone, a palm computer, a sensor device, or any other apparatus provided with radio communication capability. In another embodiment, the apparatus carrying out the above-described functionalities is comprised in such a device, e.g. the apparatus may comprise a circuitry such as a chip, a chipset, a processor, a micro controller, or a combination of such circuitries in any one of the above-described devices. The apparatus may be an electronic device comprising electronic circuitries for realizing some embodiments of the present invention.

Referring to FIG. 6, the apparatus may comprise a station entity 50 providing the apparatus with capability of communicating in the wireless network of the access node 110. The station entity may comprise a radio interface 52 providing the apparatus with radio communication capability. The radio interface 52 may support frame transmission on the unlicensed frequency bands. It may comprise radio frequency converters and components such as an amplifier, filter, frequency-converter, (de)modulator, and encoder/decoder circuitries and one or more antennas. The station entity 50 may further comprise a radio modem 58 configured to carry out transmission and reception of messages in the wireless network.

The station entity 50 may further comprise a channel estimation circuitry 54 configured to sense a plurality of frequency channels, as described above. The channel estimation circuitry 54 may be configured to estimate the presence of other networks on a frequency channel and/or to measure the channel occupancy rate on the frequency channel and/or to measure channel access delay on the frequency channel. The channel estimation circuitry 54 may be configured to execute the process of FIG. 4 or 5, for example.

The station entity 50 may further comprise a controller 55 configured to control transmissions and functions of the station entity 50. The controller 55 may, for example, control the establishment of the association in step 300, to control the channel estimation circuitry to perform the channel sensing, to select the channel access parameters, and to control the radio modem to carry out frame transmissions on the frequency channel by using the selected channel access parameters. The station entity may comprise at least one processor comprising the controller 56 and the channel estimation circuitry 54 and, optionally, at least some of the circuitries of the radio modem 58.

The apparatus may further comprise an application processor 56 executing one or more computer program applications that generate a need to transmit and/or receive data through the station entity 50. The application processor may form an application layer of the apparatus. The application processor may execute computer programs forming the primary function of the apparatus. For example, if the apparatus is a sensor device, the application processor may execute one or more signal processing applications processing measurement data acquired from one or more sensor heads. If the apparatus is a computer system of a vehicle, the application processor may execute a media application and/or an autonomous driving and navigation application. The application processor may generate data to be transmitted in the wireless network.

The apparatus may further comprise a memory 60 storing one or more computer program products 62 configuring the operation of said processor(s) of the apparatus. The memory 60 may further store a configuration database 64 storing operational configurations of the apparatus. The configuration database 64 may, for example, store the channel access parameters and/or the channel access limits for one or more frequency channels.

Figure 7:
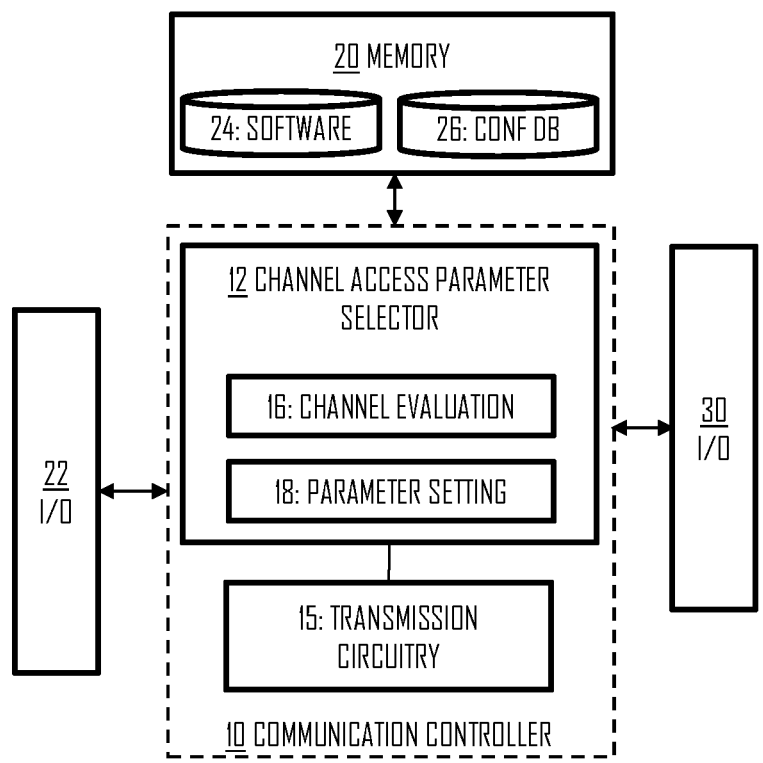

FIG. 7 illustrates an embodiment of a structure of the above-mentioned functionalities of an apparatus executing the functions of the access node 110 in the process of FIG. 2 or any one of the embodiment described above for the access node 110. The access nodes 110 and 112 may be identical and both support all the functions described above for either access node 110, 112, or they may support different radio access technologies but still both be capable of carrying out the embodiments described above for the access node. In another embodiment, the apparatus carrying out the above-described functionalities of the access node is comprised in such a device, e.g. the apparatus may comprise a circuitry, e.g. a chip, a chipset, a processor, a micro controller, or a combination of such circuitries in the access node. The apparatus may be an electronic device comprising electronic circuitries for realizing some embodiments of the access node.

Referring to FIG. 7, the apparatus may comprise a first communication interface 22 or a communication circuitry configured to provide the apparatus with capability for bidirectional communication with stations over a radio interface. The communication interface may comprise radio frequency circuitries for processing received control frames and data frames and control frames and data frames to be transmitted. The communication interface 22 may comprise standard well-known components such as an antenna array, amplifier, a filter, a frequency converter, and encoder/decoder circuitries.

The apparatus may further comprise a second communication interface 30 or a communication circuitry configured to provide the apparatus with capability for bidirectional communication with other access nodes and to other networks, e.g. the Internet. In an embodiment, the apparatus communicates with the other access nodes through the communication interface 22 used for communication with the stations. The communication interface 22 may comprise standard well-known components such as an amplifier, a filter, and encoder/decoder circuitries. The communication interface may comprise multiple interfaces, e.g. an X2 interface and S1 interfaces of the LTE.

The apparatus may further comprise a memory 20 storing one or more computer program products 24 configuring the operation of at least one processor 10 of the apparatus. The memory 20 may further store a configuration database 26 storing operational configurations of the apparatus, e.g. detected neighbouring networks, their operative frequency channels and associated channel access limits.

The apparatus may further comprise the at least one processor 10 configured to carry out the process of FIG. 2 or any one of its embodiments. The processor may comprise a communication controller controlling the operation of the access node. Referring to FIG. 7, the processor(s) 10 comprise(s) a channel access parameter selector 12 and a transmission circuitry 15. The transmission circuitry 15 may carry out frame transmissions in a wireless network managed by the apparatus. The frame transmissions may include transmissions of frames to stations associated to the apparatus in which case the transmission circuitry 15 may employ the selected channel access parameters for frame transmissions on the selected channel.

The channel access parameter selector 12 may comprise a channel evaluation circuitry 16 configured to carry out blocks 200 and 202, 400, or 500. The channel access parameter selector may then select a frequency channel on the basis of the channel evaluation performed by the channel evaluation circuitry 16. A parameter setting circuitry 18 may also employ the channel evaluation results of the channel evaluation circuitry, and carry out the selection of the channel access parameters for the selected frequency channel. The parameter setting circuitry 18 may perform any one or more of blocks 204, 206, 308, 404, 406, 504 and 506.

As used in this application, the term 'circuitry' refers to one or more of the following: (a) hardware-only circuit implementations such as implementations in only analog and/or digital circuitry; (b) combinations of circuits and software and/or firmware, such as (as applicable): (i) a combination of processor(s) or processor cores; or (ii) portions of processor(s)/software including digital signal processor(s), software, and at least one memory that work together to cause an apparatus to perform specific functions; and (c) circuits, such as a microprocessor(s) or a portion of a microprocessor(s), that require software or firmware for operation, even if the software or firmware is not physically present.

This definition of 'circuitry' applies to uses of this term in this application. As a further example, as used in this application, the term "circuitry" would also cover an implementation of merely a processor (or multiple processors) or portion of a processor, e.g. one core of a multi-core processor, and its (or their) accompanying software and/or firmware. The term "circuitry" would also cover, for example and if applicable to the particular element, a baseband integrated circuit, an application-specific integrated circuit (ASIC), and/or a field-programmable grid array (FPGA) circuit for the apparatus according to an embodiment of the invention.

The processes or methods described in FIGS. 2 to 5 may also be carried out in the form of one or more computer processes defined by one or more computer programs. A separate computer program may be provided in one or more apparatuses that execute functions of the processes described in connection with the Figures. The computer program(s) may be in source code form, object code form, or in some intermediate form, and it may be stored in some sort of carrier, which may be any entity or device capable of carrying the program. Such carriers include transitory and/or non-transitory computer media, e.g. a record medium, computer memory, read-only memory, electrical carrier signal, telecommunications signal, and software distribution package. Depending on the processing power needed, the computer program may be executed in a single electronic digital processing unit or it may be distributed amongst a number of processing units.

Embodiments described herein are applicable to wireless networks defined above but also to other wireless networks. The protocols used, the specifications of the wireless networks and their network elements develop rapidly. Such development may require extra changes to the described embodiments. Therefore, all words and expressions should be interpreted broadly and they are intended to illustrate, not to restrict, the embodiment. It will be obvious to a person skilled in the art that, as technology advances, the inventive concept can be implemented in various ways. Embodiments are not limited to the examples described above but may vary within the scope of the claims.

The invention claimed is:

1. An apparatus comprising at least one processor and at least one memory including computer program code, the at least one memory and computer program code configured, with the at least one processor, cause the apparatus at least to:

receive a scanning message comprising at least one information element indicating a channel access limit for a frequency channel operated by an access node of a second wireless network;

select, on the basis of the at least one information element, the frequency channel or another frequency channel for an ultra-reliable low-latency, URLLC, service provided by the apparatus; and cause, upon selection of the frequency channel for the URLLC service, transmission of frames of the service within channel access limits indicated by the at least one information element.

2. The apparatus of claim 1, wherein the URLLC service has minimum requirements for channel access in terms of latency and reliability, and wherein the at least one memory and computer program code are further configured to cause the apparatus to determine whether or not the channel access limits indicated by the at least one information element allow the minimum requirements for the channel access and to select the frequency channel, if the channel access limits indicated by the at least one information element allow the minimum requirements for the channel access.

3. The apparatus of claim 1, wherein the at least one memory and computer program code are further configured to cause the apparatus, to select, upon selection of the frequency channel, channel access parameters for the frames such that the channel access parameters are more limited than what is indicated by the channel access limit.

4. The apparatus of claim 3, wherein the channel access limit defines a maximum channel occupancy time, and wherein the at least one memory and computer program code are further configured to select a maximum channel occupancy time that is shorter than the maximum channel occupancy time indicated by the channel access limit.

5. The apparatus of claim 1, wherein the channel access limit indicates that the access node of the second wireless network operates an URLLC service on the frequency channel, and wherein the at least one memory and computer program code are further configured to select the frequency channel for the URLLC service provided by the apparatus.

6. The apparatus of claim 1, wherein the at least one memory and computer program code are further configured to select channel access limits for the service on the selected frequency channel and to cause transmission of a scanning message indicating the selected channel access limits.

7. The apparatus of claim 1, wherein the at least one memory and computer program code are further configured to measure channel occupancy rate on the selected frequency channel and to select channel access parameters for the frames on the basis of said measured channel occupancy rate.

8. The apparatus of claim 7, wherein the at least one memory and computer program code are further configured to select a maximum channel occupancy time on the basis of the measured channel occupancy rate.

9. The apparatus of claim 1, wherein the at least one memory and computer program code are further configured to determine whether or not another wireless network operates on the selected frequency channel, to select a first value of a channel access parameter for the frames if another wireless network is determined to operate on the selected frequency channel, and to select a second value of the channel access parameter for the frames if no other wireless network is determined to operate on the selected frequency channel, and wherein the first value defines more limited channel access than the second value.

10. The apparatus of claim 1, wherein the first wireless network operates according to a different radio access technology than the second wireless network.

11. A method comprising:
receiving, by a first access node of a first wireless network, a scanning message comprising at least one information element indicating a channel access limit for a frequency channel operated by a second access node of a second wireless network;
selecting, by the first access node on the basis of the at least one information element, the frequency channel or another frequency channel for an ultra-reliable low-latency, URLLC, service provided by the apparatus; and
upon selecting the frequency channel for the URLLC service, causing by the first access node transmission of frames of the service within channel access limits indicated by the at least one information element.

12. The method of claim 11, wherein the URLLC service has minimum requirements for channel access in terms of latency and reliability, and wherein the first access node determines whether or not the channel access limits indicated by the at least one information element allow the minimum requirements for the channel access and selects the frequency channel, if the channel access limits indicated by the at least one information element allow the minimum requirements for the channel access.

13. The method of claim 11, wherein the first access node selects, upon selecting the frequency channel, channel access parameters for the frames such that the channel access parameters are more limited than what is indicated by the channel access limit.

14. The method of claim 13, wherein the channel access limit defines a maximum channel occupancy time, and wherein the first access node selects a maximum channel occupancy time that is shorter than the maximum channel occupancy time indicated by the channel access limit.

15. The method of claim 11, wherein the channel access limit indicates that the second access node of the second wireless network operates an URLLC service on the frequency channel, and wherein the first access node selects the frequency channel for the URLLC service provided by the first access node.

16. The method of claim 11, wherein the first access node selects channel access limits for the service on the selected frequency channel and causes transmission of a scanning message indicating the selected channel access limits.

17. The method of claim 11, wherein the first access node measures channel occupancy rate on the selected frequency channel and selects channel access parameters for the frames on the basis of said measured channel occupancy rate.

18. The method of claim 17, wherein the first access node selects a maximum channel occupancy time on the basis of the measured channel occupancy rate.

19. The method of claim 11, wherein the first access node determines whether or not another wireless network operates on the selected frequency channel, selects a first value of a channel access parameter for the frames if another wireless network is determined to operate on the selected frequency channel, and selects a second value of the channel access parameter for the frames if no other wireless network is determined to operate on the selected frequency channel, and wherein the first value defines more limited channel access than the second value.

20. A non-transitory computer-readable medium comprising a computer program code, wherein execution of the computer program code by a processor configures an apparatus to at least:
receive, by a first access node of a first wireless network, a scanning message comprising at least one information element indicating a channel access limit for a frequency channel operated by a second access node of a second wireless network;
select, by the first access node on the basis of the at least one information element, the frequency channel or another frequency channel for an ultra-reliable low-latency, URLLC, service provided by the apparatus; and
cause, upon selection of the frequency channel for the URLLC service, by the first access node transmission of frames of the service within channel access limits indicated by the at least one information element.

\* \* \* \* \*